Patented Jan. 19, 1943

2,308,857

UNITED STATES PATENT OFFICE 2,308,857

SODIUM CALCIUM BOROSILICATE GLASS

Urban E. Bowes, Perrysburg, Ohio, assignor to Owens-Corning Fiberglas Corporation, a corporation of Delaware No Drawing. Application December 20, 1939, Serial No. 310,189

4 Claims. (Cl. 106—50)

The present invention relates to glass compositions and to glass and glass wool or fibers made therefrom having certain novel characteristics.

In the use of glass wool or fibrous glass products made from glasses of conventional chemical composition, I have discovered that the glass wool ages rapidly, becomes gradually weaker and more brittle as time goes on, and also has deleterious effects upon surrounding substances, particularly certain metals. The aging of glass wool in its various uses and the destructive effects upon surrounding materials such as metals, is particularly marked when the wool is maintained in the presence of moisture or water.

The aging and destructive effects of the glass wool upon the surrounding materials is primarily due to the presence of alkali in the composition of the glass materials of which the glass wool is composed, this alkali ingredient being capable of being leached from the surface of the glass wool fibers, leaving an etched surface, which, when examined under a microscope, consists of peaks and valleys, sharp points, fissures and discontinuities in the surface. The autogenous destruction of the fibers under atmospheric conditions, commonly known as weathering, appears to result from the absorption of moisture by the alkali content of the glass from the air to form a basic solution. This solution attacks the glass, liberating more alkali and starting a cycle which destroys the fiber. It is an object to overcome this difficulty.

Another property required for glass wool as a result of its large surface area is acid resistance. The fibrous glass frequently comes in contact with high acid concentrations in the atmosphere, as, for example, in cities, on railroads, etc., or may come in contact with high concentrations of electrolyte, as, for example, on ships or otherwise near salt water or brine. The bulk of mineral wools commonly known as rock wools are formed of compositions having very low acid resistance. It is an object to provide a material which will be characterized by a high degree of resistance to acids.

The introduction of sharp corners appears to set up a concentration of stresses which causes a premature rupture in the fibers and a marked loss in strength. The presence of sulphur in the sulphide state found in rock wools or any of the wools made in a cupola furnace, also has serious deleterious effects upon surrounding materials. Such materials or materials having a high alkali content tend to corrode the walls confining the glass or rock wool when it is used as insulating material for panels made of such substances. For example, tests show that a panel made of aluminum or the like is seriously corroded when retained in contact with such prior mineral wool.

In ordinary bodies of glass, such as bottles or the like, this problem is not encountered since the surface area is relatively small, for example, 40 square inches to a pound of glass, and most of the glass is a substantial distance from the surface. However, when glass is attenuated into fine fibers, the surface area is vastly increased until a pound of glass would present a surface area of an order of magnitude of several acres. Not only is the surface area increased but in addition the distance for the alkali to travel to reach the surface is rendered extremely small, the greatest distance, of course, being the radius of the fiber which is but a few microns under ordinary circumstances. All these factors place the alkali problem and composition problem in an entirely different light. When a body of glass is reduced to long attenuated fibers, the surface area is so vastly increased that the alkali may readily be leached from the surface and cause a serious and fatal weakening of the fibrous body as a whole.

Another requirement for the production of fibrous glass products containing long fibers having a minimum of shot, is a long viscosity range. Mineral compositions of the rock wool variety have a very short viscosity range and freeze from a watery melt to a stony crystalline mass at temperatures of the order of 2400° F. which renders them generally unsuitable for fabrication by the highly efficient method described in the Slayter and Thomas Patent 2,133,236. The surface tension and viscosity of mineral wools is such that short fine fibers with a high percentage of shot are obtained, whereas a gradual viscosity extending from about 60 to 70 poises at 2500° F. to about 300 poises at 2200° F. is desired for producing long fibers of larger diameters and with a minimum of shot which results in a lightweight superior insulation.

Another important requirement for glasses for the efficient production of glass wool is a low devitrification temperature. Batch cost, ease of melting and fining and moderate temperature requirements are also important aims of the present invention.

I have discovered a relatively narrow range of compositions by which the above objects may be obtained. In particular, I have discovered that compositions somewhat similar to soda-lime glasses may be used by the expedient of adding a small amount of boric oxide to such glasses and other small changes which eliminate all or substantially all autogenous alkali attack and give an otherwise superior and desirable product. This discovery has enabled a relatively inexpensive acid resistant and weathering resistant glass having a gradual viscosity curve and a low devitrification, coupled with low cost, to be used. My glass embraces the following ranges which, while critical, may be varied somewhat but with a loss of one or more objects of the invention:

| | Percent |
|---|---|
| SiO₂ | 60 to 65 |
| CaO and MgO | 15 to 20 |
| Na₂O and K₂O | 8 to 12 |
| B₂O₃ | 2 to 7 |
| R₂O₃ | 2 to 6 |

The molar ratio of lime to magnesia should be at least 1:1 and preferably about 4:1. In this connection, I have discovered that such a ratio enables the lowest devitrification temperature with this combination to be achieved. If the ratio of lime to magnesia is less than 1:1, or if more than about 8:1 ratio is used, a higher devitrification range is encountered. At least about 15% lime and magnesia are required as a flux. More than 20% of such oxides decreases acid resistances and increases the speed and temperature of devitrification. The viscosity and cost of magnesia glasses without lime in the proportions noted are excessive for fibrous glass.

The silica should be in the above noted range since if below 60% the acid resistance is inferior, and if about 65% or in any event as it approaches about 70% the viscosity is excessive for forming into fibers. The alkali is also critical since more alkali than 12% will affect the atmospheric durability adversely and less alkali will make the glass too refractory and cause devitrification at high temperatures.

R₂O₃ is generally represented by alumina or iron oxide. Excessive alumina is generally incompatible with acid resistance, but a small amount in cases where the alkali is low will assist in depressing the devitrification tendency.

Boric oxide should be present in the glass of this invention in amounts of from 2 to 7%. A greater boric oxide content than this serves no useful purpose and raises the cost. A boric oxide content lower than about 2 to 3% causes the glass to devitrify at high temperatures and also causes the alkali to hydrate and autogenously destroy the fibers.

A preferred composition, possessing all of the desirable characteristics above noted, is as follows:

| | Percent |
|---|---|
| SiO₂ | 63 |
| CaO | 14 |
| MgO | 3 |
| B₂O₃ | 5 |
| Na₂O and K₂O | 10 |
| R₂O₃ | 5 |

As a test to which my novel glass composition conforms when in fibrous form, and as a test to which fibrous glass should conform in order to produce a glass having suitable chemical durability, I use the following standard alkali test:

Introduce into a 200 cc. Pyrex Erlenmeyer flask exactly one gram of glass fiber of average fiber diameter not greater than about .0005 inch and of maximum fiber diameter not greater than .0007 inch. Add exactly 100.0 cc. of N/100 sulphuric acid and close the flask with a standard one-hole rubber stopper. Partially immerse the flask to a depth of 2" in a thermostatically controlled water bath, set at 90 C. and maintain therein for a period of four hours. Remove the flask from the bath, cool quickly in running water, add 5 to 6 drops of standard phenophthalein indicator solution and titrate the excess acid with standard N/50 sodium hydroxide solution until a very faint pink color is obtained. To calculate percent of sodium oxide extracted, use the following formula:

$$(.031\ (100.0 - 2(\text{cc. of NaOH used}))) = \%\ \text{sodium oxide.}$$

Under the above test the amount of alkali oxide which is leached from the glass surface under prescribed conditions should not exceed .20% by weight of sodium oxide present. Actually my glass does not exceed about .13% by weight.

Modifications may be resorted to within the spirit and scope of the appended claims.

I claim:

1. Glass in fibrous form having a composition comprising

| | Per cent |
|---|---|
| SiO₂ | 60 to 65 |
| CaO and MgO | 15 to 20 |
| Na₂O and K₂O | 8 to 12 |
| B₂O₃ | 2 to 7 |
| R₂O₃ | 2 to 6 | wherein the proportion of lime to magnesia is at least 1:1 but less than 8:1.

2. A glass wool lightweight bat of which the glass has a composition comprising

| | Per cent |
|---|---|
| SiO₂ | 60 to 65 |
| CaO and MgO | 15 to 20 |
| Na₂O and K₂O | 8 to 12 |
| B₂O₃ | 2 to 7 |
| R₂O₃ | 2 to 6 | wherein the proportion of lime to magnesia is substantially 4:1.

3. A glass wool lightweight bat of which the glass has a composition comprising substantially

| | Per cent |
|---|---|
| SiO₂ | 63 |
| CaO | 14 |
| MgO | 3 |
| B₂O₃ | 5 |
| Na₂O and K₂O | 10 |
| R₂O₃ | 5 |

4. Fibrous glass as claimed in claim 1 in which the alkali oxide which may be leached from the surface of said fibrous glass under the standard alkali test substantially as described, does not exceed .20% by weight of sodium oxide present.

URBAN E. BOWES.